Patented Aug. 20, 1929.

1,725,335

UNITED STATES PATENT OFFICE.

HAROLD H. BROWN, OF ST. ALBANS, VERMONT.

INSULATION MATERIAL.

No Drawing.   Application filed June 22, 1925. Serial No. 38,838.

This invention relates to insulating material for electric conduits, and more particularly to a wrapping for the wires of such conduits.

An object of the invention is to provide an improved insulating material in the form of paper, that may be cut up into strips and wound upon individual wires or groups of wires of a cable. Other objects are to provide such materials of a strength sufficient to withstand comparatively large tensile strains, flexible and tough so, as to withstand wire-bending strains, highly efficient in insulation effect, light in weight, and non-deteriorating from age or exposure to conditions met in the use of electric conduit cables.

Heretofore wires for electric conduits have been insulated in a number of ways, as for example by weaving or winding on them a covering of cotton fabric, coating with rubber or varnish, wrapping with paper, coating with wet fibre pulp, etc. The present invention does not consist in any new method of insulating wires, or in any new method of manufacturing insulation, but consists in my discovery that an insulating material preferably in the form of a paper but also usable in the form of a plastic coating, of decidedly improved characteristics as compared with similar insulating materials of different materials as heretofore used, may be made from the fibre of the leaves of certain plants.

Over a wide area in South America plants of the Bromelia family grow wild and in great abundance. Somewhat similar plants of the species *Billbergia speciosa Thunb*, are also found. Species of these plant families are known locally by the names caroa, gravata, croa, and coroata. The one most available and desirable for use as herein described is the caroa plant, a member of the species botanically known as *neoglaziova variegata*. The particular characteristics of these plants are that they comprise a plurality of crescent shaped leaves, interfitting at the base or stalk of the plant. The leaves are of considerable thickness, and have an outer hard casing, an inner gummy comparatively soft covering or layer, and an intermediate body portion made up almost entirely of longitudinal fibres, with an intermediate pith or matrix of vegetable matter. It is the fibre of the intermediate portion of these leaves that I have discovered to be peculiarly available as a material for making insulating covering for electric wires. This fibre is exceedingly fine individual cross-section, superfine as compared to the fibre of cotton, flax, or wood pulp, very strong, yet soft and pliable. It possesses qualities making it highly effective as an electric insulating dialectric. It is obtained from the plants by stripping the leaves therefrom, peeling off the outer hard shell and the inner covering, beating the fibrous body to separate the pith, then drying, baling, and shipping the fiber to the manufacturing plants.

The insulating material may be made up from this fibre by an ordinary paper-making process, not a part of this invention, and therefore not here described in detail. I prefer this form of insulation for my discovery. When the paper-making processs is completed there results a paper having unusual tensile strength, great porosity, that is to say comparatively large occlusion of air, and very fine fibrous structure and texture. Or the fibre may be made into a wet plastic pulp as in the paper-making process, and this pulp may be molded about wires to be insulated. After drying the cover is very tenacious and entirely effective as a dialectric. Or the fibre may be made into threads and wound or woven on the wires to be insulated.

Tests made of a cable comprising one hundred wires, two thousand feet long, the only insulating material being wrappings of paper made from caroa plant fibre above referred to have been made by one of the electrical companies, and have demonstrated that this insulating material is markedly superior to any other forms of fibre insulation heretofore used. In addition it was found that this cable had very much lower capacity than with fibrous insulating materials previously used.

As to the cause of these unusually efficient dialectric effects, I am not sure. But I believe they are in part due to the very fine fibrous nature of the special pulp produced, occluding so much air as to produce the effect largely of mere air spaces between wires. As compared with other fibrous coverings that are used for insulation the texture of that herein referred to may be termed superfine, and the occluded air content in comparison is therefore relatively or comparatively large.

I claim:

1. An electric insulating material composed of the fibre of plant leaves of the Bromelia family.

2. An electric insulating material composed of the fibre of plant leaves of the neoglaziovia variegata species of the Bromelia family.

3. An electric insulating material composed of the fibre of the caroa plant of the neoglaziovia variegata species of the Bromelia family.

4. An electric insulating material in the form of a paper composed of the fibre of plant leaves of the Bromelia family.

5. An electric insulating material for conduits in the form of a paper composed of the fibre of plant leaves of the neoglaziovia variegata species of the Bromelia family.

6. An electric insulating material for conduits in the form of a paper composed of the fibre of the caroa plant of the neoglaziovia variegata species of the Bromelia family.

In testimony whereof, I sign my name.

HAROLD H. BROWN.